H. HERTZBERG, A. A. LOW & M. J. WOHL.
SEMISUBMERGED SUBMARINE GUNBOAT AND TORPEDO BOAT.
APPLICATION FILED MAY 25, 1909.
971,676.
Patented Oct. 4, 1910.
4 SHEETS—SHEET 2.
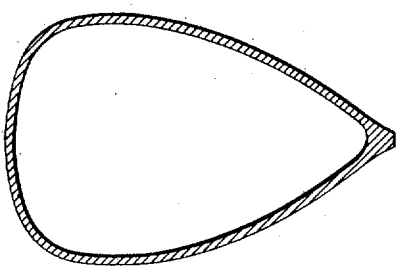
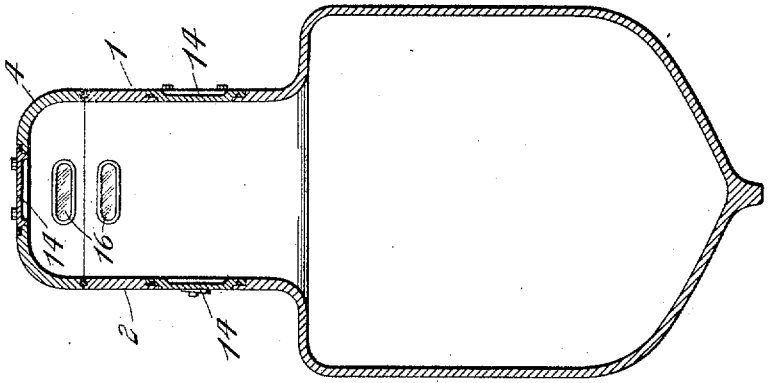
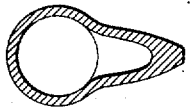
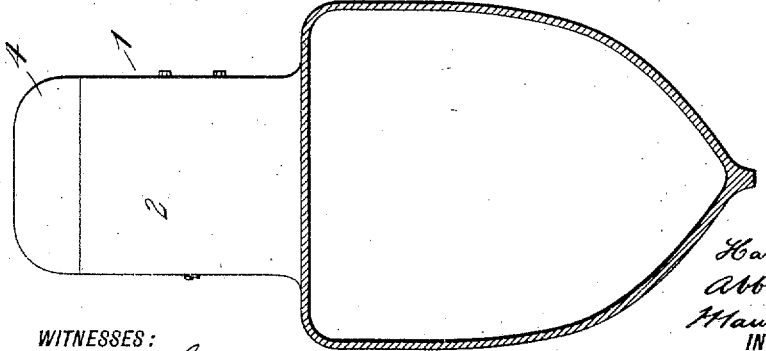
WITNESSES:
Harry Hertzberg,
Abbot A. Low,
Maurice J. Wohl,
INVENTORS
BY
Lewis J. Doolittle
ATTORNEY

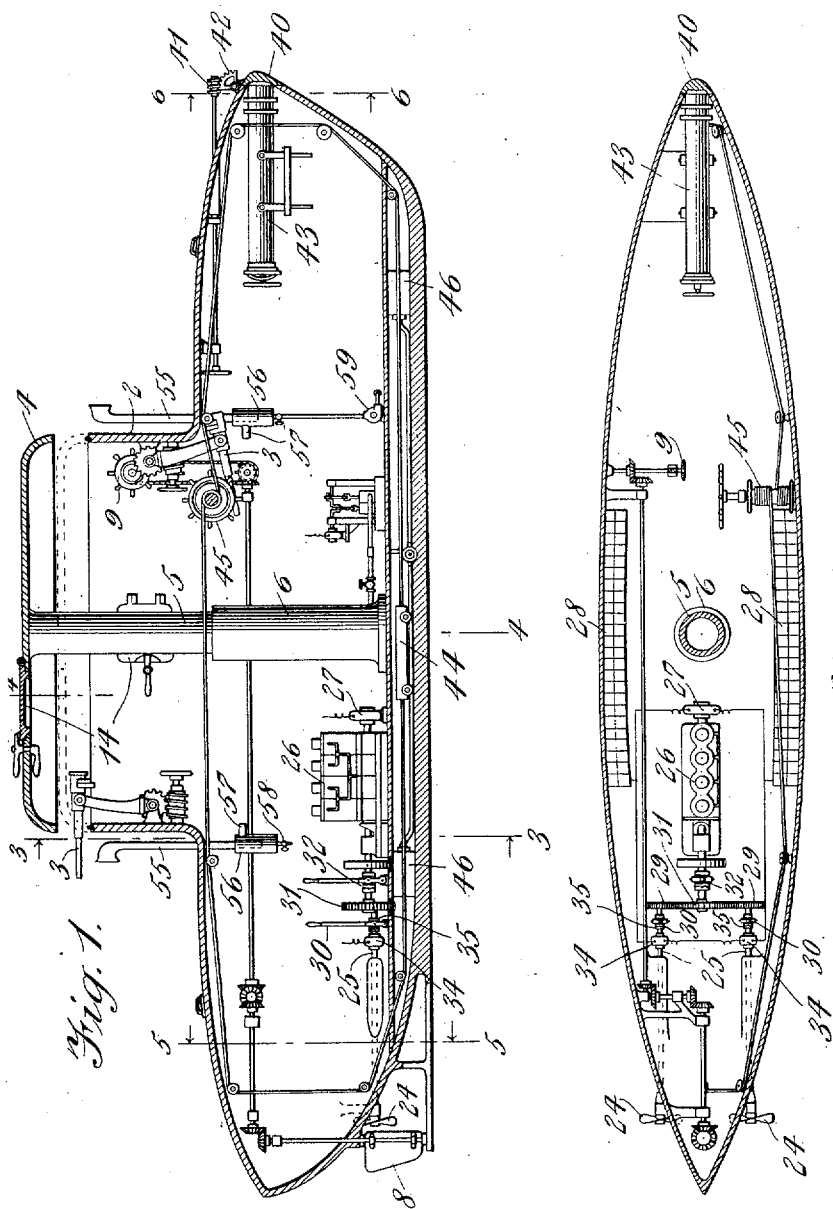

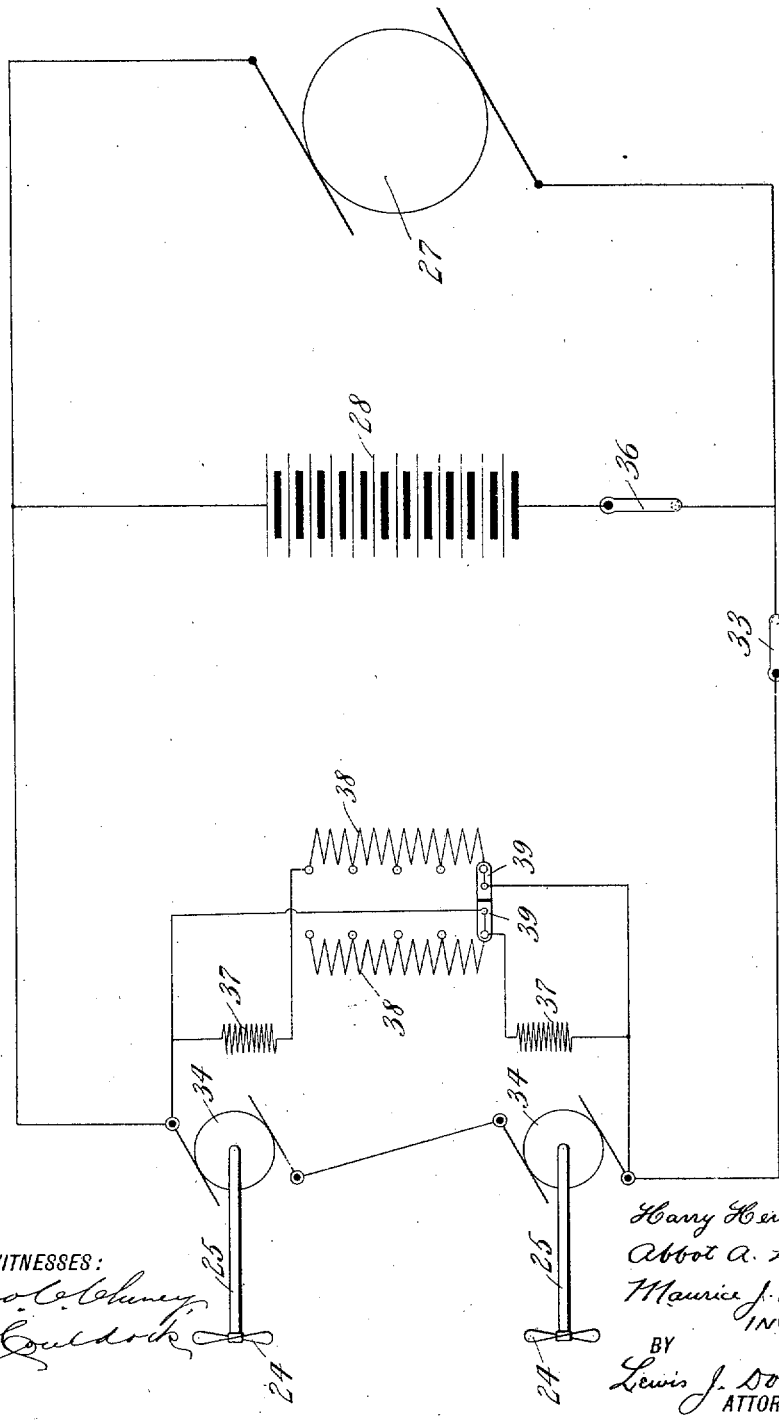

H. HERTZBERG, A. A. LOW & M. J. WOHL.
SEMISUBMERGED SUBMARINE GUNBOAT AND TORPEDO BOAT.
APPLICATION FILED MAY 25, 1909.
971,676.
Patented Oct. 4, 1910.
4 SHEETS—SHEET 4.
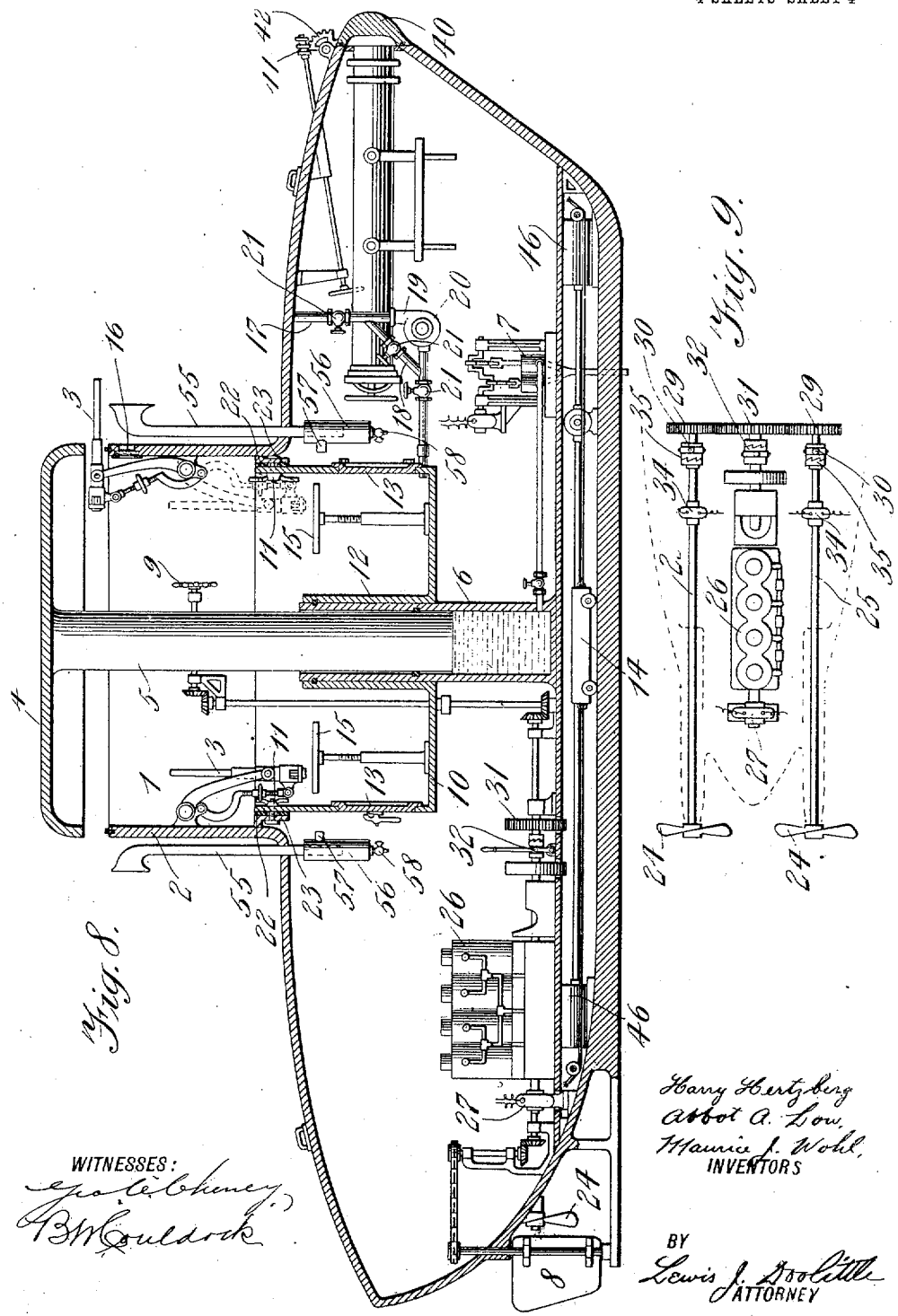

UNITED STATES PATENT OFFICE

HARRY HERTZBERG, OF BROOKLYN, ABBOT A. LOW, OF HORSESHOE, AND MAURICE J. WOHL, OF NEW YORK, N. Y., ASSIGNORS TO ABBOT A. LOW, OF HORSESHOE, NEW YORK, HARRY HERTZBERG, OF BROOKLYN, NEW YORK, AND MAURICE J. WOHL, OF NEW YORK, N. Y., TRUSTEES.

SEMISUBMERGED SUBMARINE GUNBOAT AND TORPEDO-BOAT.

971,676.  Specification of Letters Patent.   Patented Oct. 4, 1910.

Application filed May 25, 1909.  Serial No. 498,320.

*To all whom it may concern:*

Be it known that we, HARRY HERTZBERG, a resident of the city of New York, borough of Brooklyn, county of Kings, and State of New York, ABBOT A. LOW, a resident of Horseshoe, St. Lawrence county, State of New York, and MAURICE J. WOHL, a resident of the city, county, and State of New York, citizens of the United States, have invented certain new and useful Improvements in Semisubmerged Submarine Gunboats and Torpedo-Boats, of which the following is a specification.

This invention relates to submarine vessels, and more particularly to those which are designed to be submerged with the exception of a conning tower, though the features of construction and arrangements of parts may be applied as well to those submarines that are designed to be totally submerged.

Among the objects of the invention are to improve the hull construction, to provide novel and advantageous propelling mechanism, to provide novel quick-acting mechanism for righting the vessel as to pitching, to guard against the entry of water into the body of the vessel through the ventilating apparatus, to separate the interior of the conning tower from the remainder of the interior of the vessel, and to provide means for admitting water to and removing the same from the chamber so formed, for the purpose of quick submergence.

Other objects and features of construction will become apparent as the specification proceeds.

In the accompanying drawings, Figure 1 is a vertical longitudinal section through a submarine vessel embodying certain features of the invention, Fig. 2 is a horizontal section through the same, Figs. 3, 4, 5 and 6 are vertical transverse sections through the hull and conning tower on the corresponding section lines of Fig. 1, Fig. 7 is a diagrammatic view of the propelling mechanism, Fig. 8 is a vertical longitudinal section through a submarine vessel, showing the means for separating the interior of the conning tower from the remainder of the interior of the vessel, and the means for admitting water to and removing the same from the chamber so formed, for the purpose of quick submergence, and Fig. 9 is a plan view of the propelling mechanism as shown in the preceding view, there being a slight mechanical rearrangement of parts to permit the descent of the "bucket."

Reference being had to these views, attention will first be called to the improved hull construction.

As is known, the accepted form for submarine or submergible vessels is the "cigar shape." Among the disadvantages of this shape are the consequent slowness of speed of the vessel and the tendency to roll. We have discarded the "cigar shape" and have adopted that shown in the drawings. It will be seen that the hull is wider at top than at bottom and that the side walls converge downward to a keel formation (see Figs. 3–6). From the conning tower 1 the deck of the vessel curves downward gradually toward the two ends, as shown in Figs. 1 and 8; and the conning tower itself is elongated horizontally lengthwise of the vessel and is provided with narrow ends at front and rear. These latter features are important, since they insure that, when the deck is awash or submerged there will be practically no foam produced by the movement of the vessel. The advantage of this in rendering the vessel inconspicuous will be apparent.

The conning tower may now be more particularly considered. The body 2 of the tower is open at the top, so that disappearing or depressible guns 3 within the tower may be projected over the upper edge thereof. The tower is adapted to be closed tightly by a raisable cover or cap 4, which may be operated in any desirable manner, but preferably by hydraulic means, there being a plunger 5 depending from the under side of the cover 4 and received in a cylinder 6, having pumping mechanism 7 of any desirable character. From the interior of the conning tower, the rudder 8 may be operated by a hand-wheel 9, through any suitable connections. In general, it will be understood that as much of the operating mechanism of the vessel as may be desirable may be located in the conning tower.

In Fig. 8 we have shown how the interior of the conning tower may be separated from the remainder of the interior of the vessel. For this purpose we provide a "bucket" 10 adapted to be secured in place so as to extend downward from the base of the conning tower into the body of the vessel. This bucket may be secured at its rim to inner sides of the conning tower near the base thereof by any suitable devices indicated at 11, and may have an aperture through its bottom provided with an upward extending tubular flange 12 for fitting around the cylinder 6 or the plunger 5. When the bucket is secured as shown in Fig. 8 it forms a chamber within the conning tower and partly within the body of the vessel, which is completely walled off from the remainder of the interior of the hull. Thus, shells or other projectiles entering the tower will be prevented from reaching the vital parts of the vessel. Strong water-tight doors or manholes 13 are provided in the sides of the bucket 10, one opening inward, the other outward. Similar manholes 14 may be provided in the cover 4 of the conning tower, and in the body of the tower. Within the bucket 10 may be provided supports 15 upon which the occupant or occupants may stand or sit, for operating the guns and for maintaining an outlook through the window 16. The chamber formed by the conning tower and the bucket 10 may be utilized for submerging the vessel. To this end suitable piping 17 extends between an opening in the deck of the vessel and the interior of the bucket. This piping is provided with two branches 18 and 19. In filling the conning tower chamber the water flows through branch 18. In emptying the chamber this branch is closed and a pump 20 in branch 19 draws the water out of the chamber. Suitable cocks 21 are provided in the piping. It will be understood, of course, that the interior of the chamber formed by the conning tower and the bucket 10 will be watertight with respect to the remainder of the interior of the vessel. In this connection attention is called to the provision of packing 22 between the rim of the bucket 10 and the flange 23 on the inside of the conning tower to which the bucket is secured by the devices 11. If desired, the devices 11 may be released and the bucket disconnected from the piping 17, when the bucket 10 may be lowered into the hull of the vessel, permitting of free access to the interior of the conning tower.

An important feature of the invention relates to dual propelling mechanism.

The numeral 24 designates twin propellers, and 25 their shafts. These propellers may be driven, either by an engine, preferably a gas engine 26, or by a dynamo 27 and storage batteries 28, the latter being conveniently arranged along the sides of the vessel. For driving the propellers directly by the engine 26 the arrangements are as follows: 29 are gears on the shafts 25, adapted to be coupled and uncoupled with reference to these shafts by slidable clutch members 35, each clutch member being operable independently, as by a lever 30. 31 is a central gear on the shaft of the engine, being adapted to be coupled and uncoupled with respect to this shaft by a movable clutch member and operating lever 32. If both of the gears 29 are coupled to their shafts and the gear 31 to its shaft, both propellers are driven. By shifting either clutch member 35 the corresponding propeller is stopped. By shifting the clutch member 32 both propellers are stopped. For propelling the boat electrically the gear 31 is uncoupled from the engine shaft. The circuit of the dynamo is now closed, as by a switch 33 (see Fig. 7). This circuit supplies two high speed motors 34, whose armatures are connected with the propeller shafts 25, preferably by being mounted thereon. For greater speed the storage batteries 28 are connected with the motors, as by a switch 36.

The boat may be steered electrically in the following manner: Disconnect the propeller shafts 25 from each other conveniently by uncoupling the gears 29 from the shafts. It will be seen that the field 37 of each motor (shunt wound) is provided with a variable resistance, consisting of resistance elements 38 and a traveling contact 39. Thus, by varying the ratio of the resistances in the two field shunts, it is possible to cause the propellers to revolve at different relative speeds, and thereby to secure a turning effect on the boat. We prefer to accomplish this result by mounting the contacts 39 to travel in unison, conveniently by connecting them as one part with insulation between. The relative arrangement of the resistance elements and traveling contacts is such that the movement of the united contacts 39 in one direction cuts resistance into one field and out of the other, while reverse movement of the united contacts reverses the operation. While the diagrammatic view indicates that the united contacts 39 travel rectilinearly, it will be obvious that the two variable resistances might be merely a double rheostat with a double pivoted contact.

The numeral 40 designates a hinged cap at the forward end of the vessel, adapted to be opened from within the vessel by any suitable means, as by a hand-wheel, shaft and worm 41 and a worm gear arc 42. The opening of this cap uncovers an aperture filled by the mouth of the torpedo tube 43.

For righting the vessel after the discharge of the torpedo, a longitudinally movable weight 44 is provided within the vessel preferably at the bottom thereof; a cable being secured at the two ends to said weight and passing around a drum 45, whereby the weight may be quickly shifted longitudinally of the vessel. In addition to this means for righting the vessel as to pitching, we may provide hydraulic means, such as a pair of tanks 46 disposed fore and aft. By filling one and emptying the other the center of gravity is displaced toward the front or rear of the vessel.

Suitable ventilators 55 project upward through the deck of the vessel. In order to prevent water or spray entering these ventilators from being dashed about the interior of the vessel, we inclose the lower portions of the ventilators in receptacles or traps 56, having air outlets 57 above the lower extremities of the ventilators. These receptacles are provided through or adjacent their bottoms with suitable means for removing collected water, as a simple cock 58, or a cock and pump 59. The water so removed may be disposed of in any suitable manner.

Preferably, though not necessarily, the engine 26 is of the kerosene oil type, as with this form of internal combustion engine considerable economy of space is possible.

We wish to call attention to the fact that the chamber formed between the conning tower and the bucket 10 is air-tight as well as water-tight, whereby the chamber will serve to buoy up the vessel should part or all of the hull become filled with water.

What we claim as new is:

1. A submarine vessel, having a conning tower projecting upward therefrom, and a bucket-shaped bottom secured at the base of the conning tower within and walling off the interior of the tower from the remainder of the interior of the vessel, said bucket-shaped bottom being depressible so as to afford free access to the interior of the conning tower.

2. A submarine vessel having a conning tower projecting upward therefrom, and a bucket-shaped bottom removably secured at the base of the conning tower within and walling off the interior of the tower from the remainder of the interior of the vessel, said bucket-shaped bottom being provided with water-tight manholes.

3. A submarine vessel, having a conning tower projecting upward therefrom, and a bucket-shaped bottom removably secured at the base of the conning tower within and having water-tight connection therewith, walling off the interior of the tower from the remainder of the interior of the vessel.

4. A submarine vessel, having a conning tower projecting upward therefrom, and a water-tight bucket-shaped bottom secured at the base of the conning tower within and walling off the interior of the tower from the remainder of the interior of the vessel, together with means for admitting water to and removing the same from the chamber formed by said bucket-shaped bottom and tower.

5. A submarine vessel having a tubular conning tower projecting upward therefrom, a raisable cover adapted to close the top of the tower, a plunger depending from said cover, a hydraulic cylinder within which said plunger works, a bucket-shaped bottom secured at the base of the conning tower within and walling off the interior of the tower from the remainder of the interior of the vessel, said bucket-shaped bottom being provided with an aperture in its base and a tubular flange extending upward from said aperture and fitting around said cylinder.

6. A submarine vessel, having a conning tower projecting upward therefrom, and a bucket-shaped bottom removably secured at the base of the conning tower within, said conning tower and bucket-shaped bottom together constituting an air-tight chamber.

Signed at the borough of Brooklyn, county of Kings, city and State of New York, this 17th day of May, 1909.

HARRY HERTZBERG.
ABBOT A. LOW.
MAURICE J. WOHL.

Witnesses:
   GEO. WELLING GIDDINGS,
   LEWIS J. DOOLITTLE.